United States Patent [19]

Chen

[11] Patent Number: 5,036,898
[45] Date of Patent: Aug. 6, 1991

[54] CONTINUOUSLY UNFURLABLE CAR WINDOW SHADE

[76] Inventor: Wen H. Chen, No. 198, Hsi Shih Rd., Hsin Shu Tsun, Yung Kang Hsiang, Tainan Hsien, Taiwan

[21] Appl. No.: 596,955

[22] Filed: Oct. 15, 1990

Related U.S. Application Data

[63] Continuation-in-part of Ser. No. 459,931, Jan. 2, 1990, abandoned.

[51] Int. Cl.⁵ .............................................. E06B 9/08
[52] U.S. Cl. .................................. 160/23.1; 160/302; 160/305; 160/370.2
[58] Field of Search ...................... 160/23.1, 300, 301, 160/302, 305, 306, 370.2

[56] References Cited

U.S. PATENT DOCUMENTS

| | | | |
|---|---|---|---|
| 1,570,104 | 1/1926 | Vancil | 160/23.1 X |
| 1,853,150 | 4/1932 | Schultes | 160/306 |
| 2,589,609 | 3/1952 | Foster | 160/23.1 |
| 2,696,249 | 12/1954 | Prokop et al. | 160/302 X |
| 3,584,910 | 6/1971 | Lupul | 160/23.1 X |
| 4,335,773 | 6/1982 | Masi | 160/23.1 |
| 4,757,852 | 7/1988 | Jentof et al. | 160/23.1 |
| 4,770,223 | 9/1988 | Ouellette | 160/302 |
| 4,781,234 | 11/1988 | Okumura et al. | 160/23.1 |
| 4,838,333 | 6/1989 | Mottura | 160/305 |

*Primary Examiner*—David M. Purol
*Attorney, Agent, or Firm*—Rogers, Howell & Haferkamp

[57] ABSTRACT

A continuously unfurlable car window shade includes a shaft having a first end coupled with a ratchet wheel formed with a control button, and a second end coupled with a knob. A window shade is attached to the shaft and rolled therearound. A spring having a first end coupled with the shaft, and a second end coupled with a rod, winds along the rod. A shell encases the shaft. An end cap having a rectangular well holds the rod. A control cap having a pawl that can be used to engage with the ratchet wheel holds the shaft. While a user pulls down the window, the ratchet wheel slides on the pawl. The rotational shaft then rotates, thus loading the spring, and unfurls the window shade. After unfurling the window shade to a desired length, the user releases the window shade. The tension pulls the knob, thus forcing the ratchet wheel to engage with the pawl, thus locking the window shade unfurled to the desired length. When wishing to furl the window shade the user just pushes the control button. The ratchet wheel thus disengages from the pawl thus allowing the torsion stored in the spring to roll back the window shade.

1 Claim, 4 Drawing Sheets

CONTINUOUSLY UNFURLABLE CAR WINDOW SHADE

BACKGROUND OF THE INVENTION

This is a continuation-in-part application of U.S. patent application Ser. No. 07/459,931 now abandoned.

This invention relates to a car window shade, more particularly, to a continuously unfurlable car window shade opposed to conventional window shades which can only be unfurled in incremental lengths.

Conventional window shades, which constitute a series of stops at which the window shades can remain stationary, can only be unfurled in incremental lengths. That is, the window shade will furl to the last stop past which it was just unfurled as soon as it is released.

Unfortunately, conventional window shades' two inherent drawbacks become increasingly disadvantageous when applied to an automobile window. First, the shade cannot be unfurled to exactly the position desired, but only to the nearest stop. This presents a real safety hazard to a automobile driver who requires glare-free vision. Second, the driver has to fiddle with the window shade trying to make it stay put at the appropriate stop. That presents a further safety hazard for the driver who needs to pay strict attention to the road.

It is therefore a purpose of the present invention to mitigate or obviate the above-mentioned drawbacks in the manner set forth in the detailed description of the preferred embodiment.

SUMMARY OF THE INVENTION

It is a primary object of the present invention to provide a window shade which is continuously unfurlable for an automobile.

It is a further object of the present invention to provide a window shade which is continuously unfurlable by means of a ratchet wheel and pawl combination.

It is a further object of the present invention to provide an automobile window shade which is attached to the automobile window by means of hooks.

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
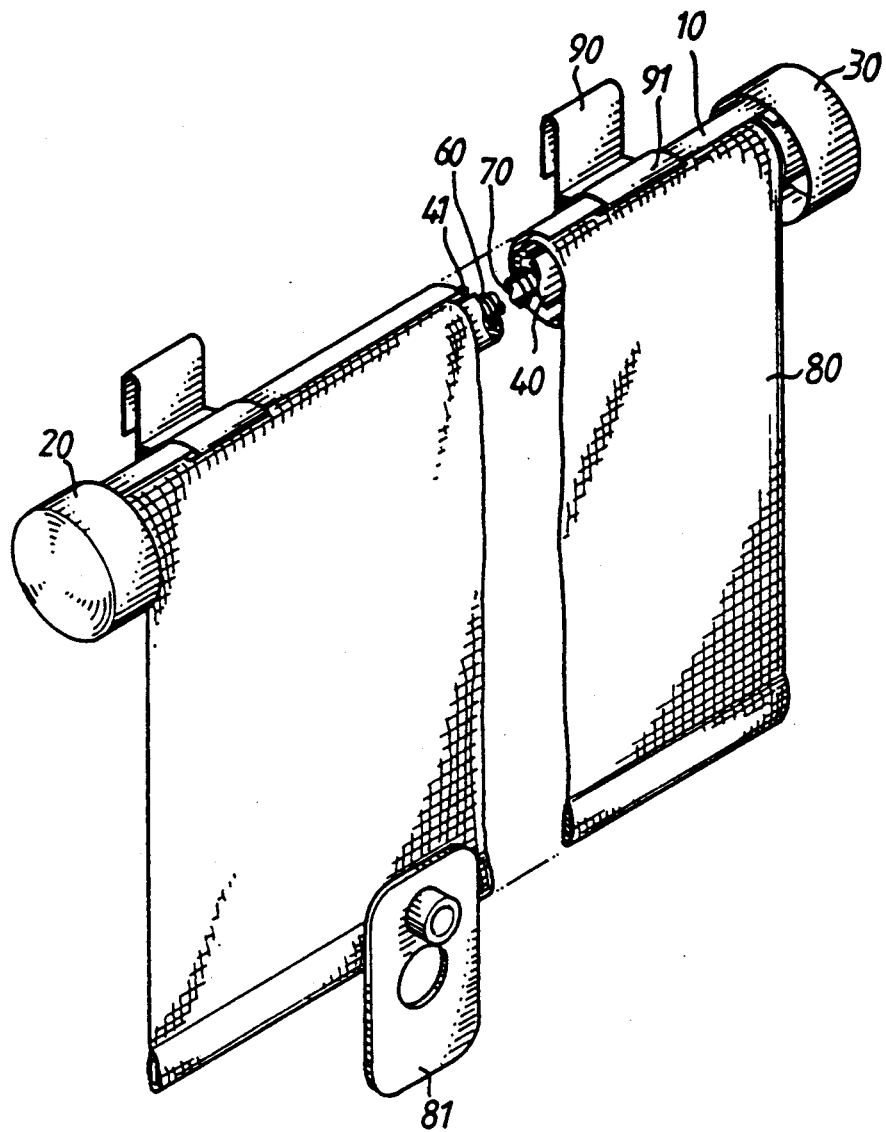
FIG. 1 is a perspective view of an embodiment of a continuously unfurlable car window shade according to the present invention.
Figure 2:
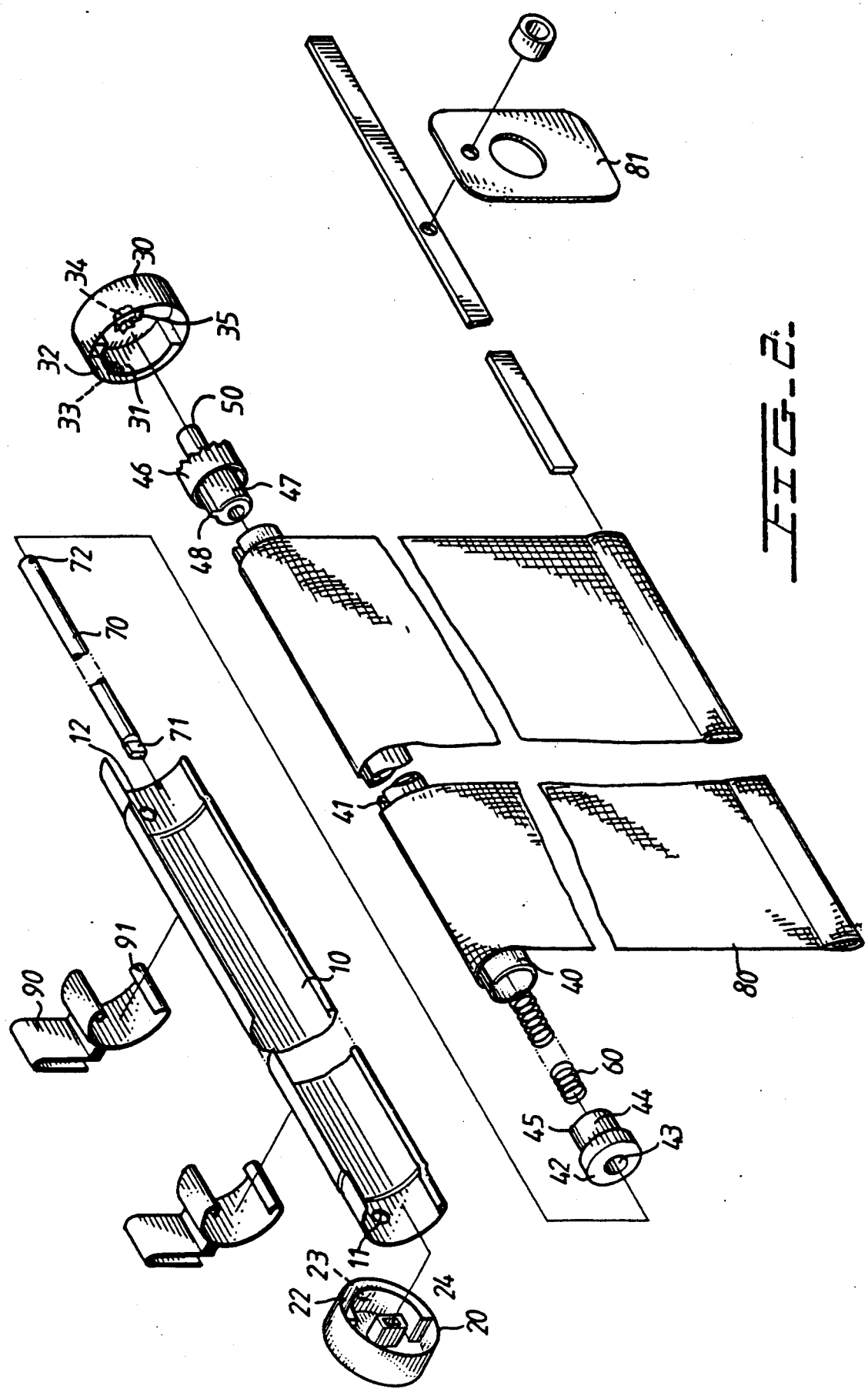
FIG. 2 is a perspective exploded view of the embodiment of the continuously unfurlable car window shade according to the present invention.

Referring to FIG. 1 and FIG. 2, a continuously unfurlable car window shade according to this invention includes a rod 70 having a flat end 71 and a hole 72 at an opposite end.

A torsion spring 60, having a first end through the hole 72, wraps the rod 70 and attaches thereto.

A rotational hollow shaft 40, having a slit 41 extending along a length thereof, encases the spring 60.

A knob 42 is formed with a hole 43 through which passes the rod 70. A protrusion 44 has a flange 45 extending along a length thereof. The knob 42 is bonded with a second end of the spring 60 and attaches to a first end of the shaft 40 with the flange 45 received in the slit 41.

Attached to a second end of the shaft 40 is a ratchet wheel 46. The ratchet wheel 46 has a protrusion 47 extending from a first end thereof, and a control button 50 extending from a second end thereof. The protrusion 47 has a flange 48 formed on a periphery thereof and extending along a length thereof. The ratchet wheel 46 attaches to the second end of the shaft 40 with the flange 48 received in the slit 41.

A window shade 80, having a first edge attached to the shaft 40 and a second edge bonded with a tab 81, is coiled around the shaft 40 and can be unfurled therefrom.

An semi-cylindrical shell 10, having a nub 11 at a first end and a nub 12 at a second end on the convex surface thereof, encases the shaft 40.

A control cap 30 is formed with a wall 31 along half an inner periphery thus defining a groove 32, and a hole 33 on the periphery thereof. The cap 30 holds the shell 10 with the groove 32 receiving the second end of the shaft 40 and with the hole 33 receiving the nub 12. The cap 30 is further formed with a pawl 35 centrally on a bottom thereof and a hole 34 at the center thereof. The cap 30 holds the shaft 40 with the control button 50 through the hole 34.

An end cap 20 similar to the cap 30 is formed with a wall 21 along half an inner periphery thus defining a groove 22, a hole 23 on a periphery and a rectangular well 24 thereof. The cap 20 not only holds the shell 10 with the groove 22 receiving the first end of the shell 10 and with the hole 23 receiving the nub 11, but also holds the rod 70 with the well 24 receiving the end 71. A hook 90, attached to the shell 10 at a 91, attaches the window shade 80 to a car window (not shown).

A user, when wishing to pull down the window shade 80, pulls the tab 81 thus causing the ratchet wheel 46 to slide on the pawl 34 and the shaft 40 to rotate. The spring 60 is thus loaded with torsion.

Figure 3:
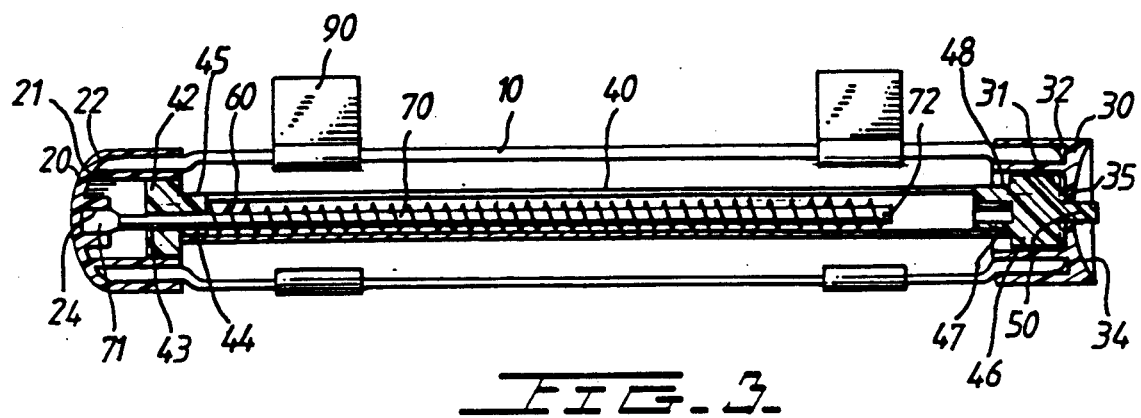
FIG. 3 is a cross-sectional view of the embodiment wherein a ratchet wheel is engaged with a pawl.

Referring to FIG. 3, the user, after unfurling the window shade 80 to a desired length, releases the tab 81. As soon as the tab 81 is released, the spring 60 pulls the stopper 42 thus causing the ratchet wheel 46 to engage with the pawl 35. The window shade 80 then remains unfurled to exactly the desired length.

Figure 4:
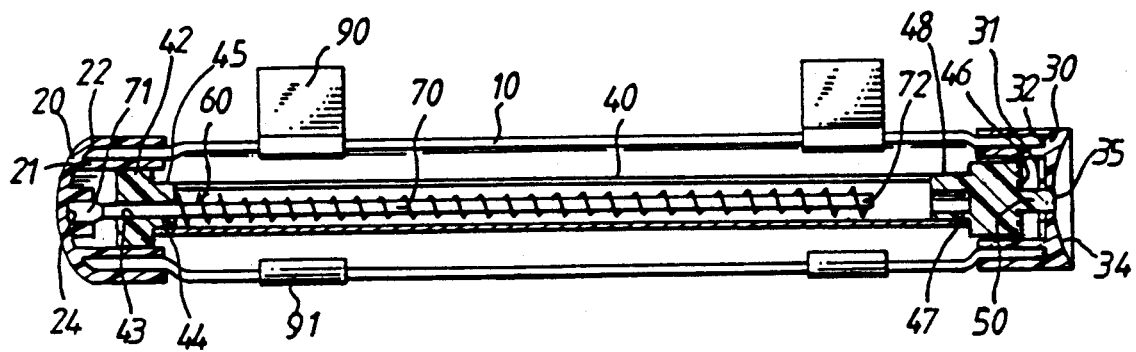
FIG. 4 is a cross sectional view of the embodiment wherein the ratchet wheel is disengaged from the pawl.
Figure 5:
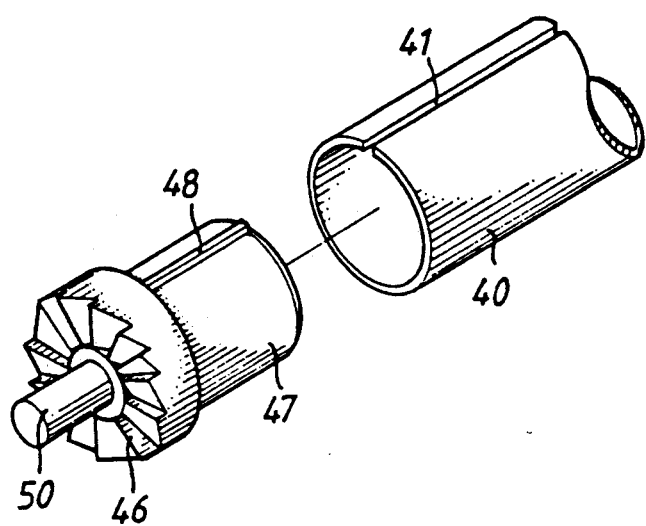
FIG. 5 is a perspective view of a ratchet wheel on which extends a control button, and a rotational hollow shaft.

Referring to FIG. 4, the user, to furl the window shade 80, pushes the control button 50 so as to disengage the ratchet wheel 46 from the pawl 35 thus allowing the shaft 40 to rotate. Subsequently, the torsion stored in the spring 60 causes the shaft 40 to rotate thereby rolling the window shade 80 back into the shell 10.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a perferred embodiment of the invention.

I claim:

1. A continuously unfurlable car window shade comprising:

a rod having a flat first end and a second end with a hole formed therethrough;

a spring having an original length shorter than that of said rod wrapping said rod and attached to said rod at said hole;

a rotational shaft having a length longer than that of said rod, a hollow encasing said spring, and a slit extending along a length thereof;

a knob coupled with a first end of said spring having a protrusion and a flange extending along a length of said protrusion, and a hole extending through both said knob and said protrusion for passing through said rod;

a ratchet wheel having a control button extending from a first end thereof, a protrusion extending from a second end thereof, and a flange extending along a length of said protrusion;

a window shade having a first edge attached to said shaft and a second edge bonded with a tab;

a semi-cylindrical shell encasing said shaft, having a first end with a first nub and a second end with a second nub, a control cap having a wall extending along half an inner periphery thereof thereby defining a groove for receiving said first end of said shell, a hole for receiving said first nub, a pawl for engaging with said ratchet wheel and a hole through which passes said control button;

an end cap having a wall extending along a half inner periphery thereof thereby defining a groove for receiving said second end of said shell, a hole for receiving said second nub, and an inner rectangular well for receiving said flat end; and a hook attached to said shell for attaching said window shade to a car window.

* * * * *